United States Patent [19]
Bennett et al.

[11] Patent Number: 5,876,477
[45] Date of Patent: Mar. 2, 1999

[54] APPARATUS FOR HEATING AND BENDING GLASS SHEETS INVOLVING RAISING A GLASS SHEET TOWARDS FURNACE HEAT SOURCES

[75] Inventors: Colin Michael Bennett, Alvechurch, United Kingdom; Masuhide Kajii; Kazuo Yamada, both of Osaka, Japan

[73] Assignees: Triplex Safety Glass Limited, Merseyside, United Kingdom; Nippon Sheet Glass Co., Limited, Osaka, Japan

[21] Appl. No.: 867,908

[22] Filed: Jun. 3, 1997

Related U.S. Application Data

[62] Division of Ser. No. 516,553, Aug. 18, 1995, Pat. No. 5,679,123.

[30] Foreign Application Priority Data

Aug. 20, 1994 [GB] United Kingdom ............... 9416893

[51] Int. Cl.$^6$ ................................................. C03B 23/00
[52] U.S. Cl. ................. 65/273; 65/274; 65/275; 65/287; 65/289; 65/290; 65/291
[58] Field of Search ............... 65/102, 106, 107, 65/111, 118, 269, 271, 273, 274, 275, 287, 289, 290, 291, 305, 307, 361, 286, 285, 317, 308

[56] References Cited

U.S. PATENT DOCUMENTS

| | | |
|---|---|---|
| 2,671,987 | 3/1954 | Jendrisak . |
| 3,001,328 | 9/1961 | Berseth . |
| 4,403,953 | 9/1983 | Suzuki ............................ 432/122 |
| 4,497,645 | 2/1985 | Peltonen . |
| 4,687,501 | 8/1987 | Reese . |
| 4,726,832 | 2/1988 | Kajii et al. . |
| 4,755,204 | 7/1988 | Boardman et al. . |
| 4,783,211 | 11/1988 | Fuchigami et al. . |
| 4,894,080 | 1/1990 | Reese et al. ...................... 65/273 |
| 4,909,822 | 3/1990 | Kitaya et al. . |
| 4,966,547 | 10/1990 | Okuyama et al. . |
| 5,085,580 | 2/1992 | Reunamaki . |
| 5,173,102 | 12/1992 | Weber et al. . |
| 5,194,083 | 3/1993 | Lehto . |
| 5,340,375 | 8/1994 | Anttonen . |
| 5,364,436 | 11/1994 | Montonen . |
| 5,437,703 | 8/1995 | Jacques et al. . |
| 5,437,704 | 8/1995 | Yli-Vakkuri et al. ................ 65/273 |
| 5,472,469 | 12/1995 | Yli-Vakkuri et al. ................ 65/273 |

FOREIGN PATENT DOCUMENTS

| | | |
|---|---|---|
| 0 338 216 | 10/1989 | European Pat. Off. . |
| 351739 | 1/1990 | European Pat. Off. . |
| 0 476 693 | 3/1992 | European Pat. Off. . |
| 0 504 117 | 9/1992 | European Pat. Off. . |
| 0 568 053 | 11/1993 | European Pat. Off. . |
| 881079 | 9/1989 | Finland . |
| 1 138 190 | 10/1962 | Germany . |
| 1761695 | 9/1952 | U.S.S.R. ............................ 65/273 |
| 784382 | 10/1957 | United Kingdom . |
| 836560 | 6/1960 | United Kingdom . |
| 890269 | 2/1962 | United Kingdom . |
| 2 201 670 | 9/1988 | United Kingdom . |

*Primary Examiner*—Peter Chin
*Assistant Examiner*—Michael P. Colaianni
*Attorney, Agent, or Firm*—Burns, Doane, Swecker & Mathis, L.L.P.

[57] ABSTRACT

When heating and bending glass sheets in a furnace, it has been found to be desirable to raise the glass sheets towards the furnace heat sources to increase obtainable temperature differentials and reduce heating power. An apparatus for bending the glass sheets includes an elongate furnace divided along its length into a plurality of heating zones, each heating zone having an upper part. A plurality of heat sources are arranged in the upper part of such heating zone and a plurality of carriages are arranged in succession along the length of the furnace below the furnace heat sources. A drive device propels the carriages through the zones of the furnace in intermittent steps, and a mould lift raises the bending mould towards the furnace heat sources. The bent glass sheet may be used in the manufacture of a vehicle glazing.

23 Claims, 6 Drawing Sheets

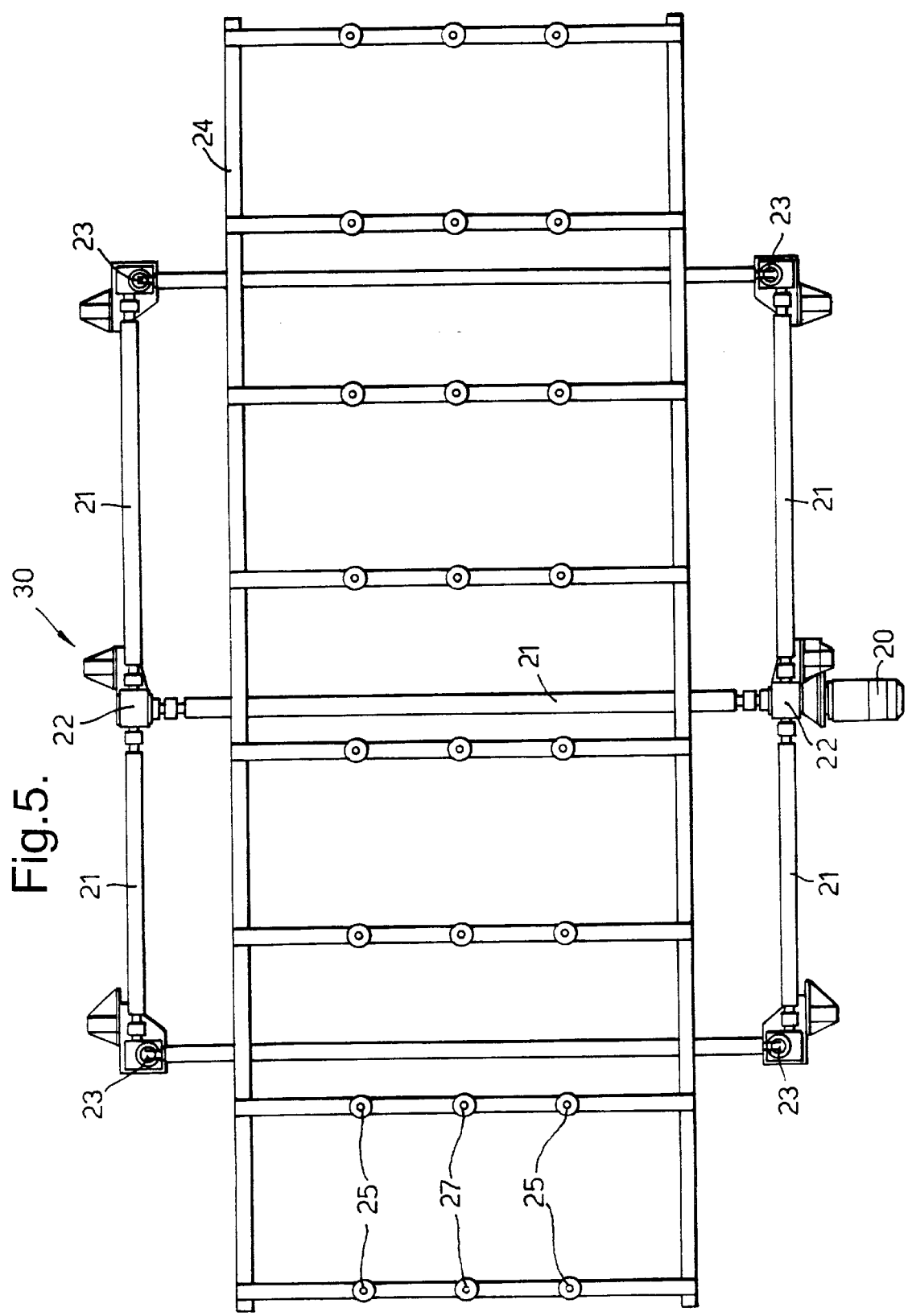

APPARATUS FOR HEATING AND BENDING GLASS SHEETS INVOLVING RAISING A GLASS SHEET TOWARDS FURNACE HEAT SOURCES

This application is a continuation, of application Ser. No. 08/516,553, filed Aug. 18, 1995, now U.S. Pat. No. 5,679,123.

BACKGROUND OF THE INVENTION

1. Field of the Invention

The present invention relates to a method of heating and bending a glass sheet, and more particularly to such a method in which the vertical distance between the glass sheet and a furnace heat source is varied. The invention also relates to apparatus for heating and bending a glass sheet in which this distance is varied. Bent glass sheets thus produced may be used in the manufacture of glazings for vehicles.

2. Description of the Related Art

It has long been recognised that it is desirable to be able to vary the vertical distance between a glass sheet and a heat source by which the sheet is heated. This technique provides a means of control of the heating effect which the heat source has on the glass sheet, and is thus a further means additional to, for example, control of heating effect by regulating the heat output of the heat source, or directing the heat by means of reflectors, shields or baffles. Control of the heating effect produced in the glass sheet is needed in many situations, for instance in glass bending to be able to produce bent glass sheets of various different shapes each requiring different degrees of heating in certain areas of the sheet to obtain the desired different shape on bending. Careful control of heating is especially important when producing bent glass sheets of complex curvature, i.e. having curvature in two directions at right angles to each other.

The need to vary the vertical distance between glass sheet and heat source occurs frequently in the bending of glass sheets for use in the manufacture of glazings for vehicles. Such sheets are commonly heated to a softened condition for bending while supported on a bending mould in a furnace. In this situation, there may be a need to vary the vertical distance between sheet and heat source during heating of the sheet. Generally, this arises because it is desired to heat one portion of the glass sheet to a higher temperature than another portion, i.e. differentially heat the glass sheet; for example, create a centre-edge temperature profile across the sheet to assist in obtaining a particular curvature, or locally heat the sheet to a higher temperature to obtain a sharper bend along a particular axis, e.g. by using an auxiliary heat source such as a crease heater. In these situations, one wishes to reduce the vertical distance between the glass sheet and the heat source at a certain stage during the heating of the sheet, and it is known to raise or lower heat sources to achieve this. However, when it is desired to vary the vertical distance between the sheet and a large number of heat sources, it is preferable from an engineering aspect to raise the sheet towards the heat sources.

A known apparatus in which the vertical distance between a glass sheet and a heat source is varied by raising the sheet towards the heat source is described in EP 476 693, corresponding to U.S. Pat. No. 5,194,083. In this apparatus, a glass sheet is placed on a bending mould on a carriage and transported to a position below a furnace. The carriage is then lifted into the furnace by means of a hoist. Additionally, the distance between the glass sheet and heating elements in the top section of the furnace may be varied by raising or lowering a movable floor of the carriage.

Clearly the rate of production attainable in such a furnace is very limited, as it can only accommodate one bending mould at a time. Furthermore, for more sophisticated control of the heating of a glass sheet, it is desirable to subject the sheet to different configurations of heating elements at different stages (as well as other control techniques e.g. different levels of heating power) during heating.

These requirements have been fulfilled by providing a glass bending apparatus comprising a furnace having a plurality of heating zones, wherein each zone can accommodate one or more bending moulds.

Such an apparatus is disclosed in U.S. Pat. No. 4,497,645. It comprises upper and lower transport runs, along which transfer cars are conveyed. The cars each have a single end wall which extends upwards towards the roof.

However, this document is concerned with improving the thermal efficiency of the furnace, and not with varying the vertical distance between a glass sheet and the furnace heat sources. It does not assist in improving control of the heating effect produced in the sheet while it is in any one zone.

SUMMARY OF THE INVENTION

It would be desirable to provide a multi-zone furnace in which the vertical distance between a glass sheet and the furnace heat sources can be varied.

According to the present invention, there is provided a method of bending a glass sheet on an apparatus comprising an elongate furnace divided along its length into a plurality of heating zones, each heating zone having an upper part, the method comprising the steps of:

(a) supporting the glass sheet on a bending mould;

(b) moving the glass sheet through the zones of the furnace in a plurality of intermittent steps, each step substantially corresponding in length to the distance separating corresponding points of successive heating zones;

(c) exposing the glass sheet during its passage through said heating zones to a succession of furnace heat sources contained in the upper part of each zone of said furnace;

(d) heating the glass sheet to a heat-softened condition as a result of said exposure;

(e) allowing the heat-softened glass sheet to sag into conformity with said bending mould;

(f) raising the bending mould, while still supporting the glass sheet, towards the furnace heat sources in at least one of the heating zones. The invention makes it possible to heat a glass sheet in a variety of different heating zones, which may have heat sources arranged to produce different heating patterns, and raise the sheet towards the heat sources in one, some or all of the zones as desired.

Preferably, the method comprises supporting the bending mould on a carriage, and moving the glass sheet through the furnace by means of said carriage.

According to another aspect of the invention, an apparatus for bending a glass sheet is provided, comprising:

an elongate furnace divided along its length into a plurality of heating zones, each heating zone having an upper part;

a plurality of furnace heat sources contained in the upper part of each of said heating zones;

a plurality of carriages arranged in succession along the length of the furnace below the furnace heat sources;

drive means for propelling the carriages through the zones of the furnace in intermittent steps, each step comprising moving the carriages from one heating zone to an adjacent heating zone by a distance separating corresponding points of successive heating zones;

at least one bending mould, the or each mould being supported on one of the carriages; and mould lift means for raising the bending mould towards the furnace heat sources.

Preferably, at least part of the bending mould is raised above the highest part of the carriage.

Two embodiments of the invention are described in more detail below. In the first, the carriage has the shape of a box, but is not raised itself. Instead, the bending mould is supported on an intermediate member disposed between the mould and the carriage, so that step (f) above comprises raising the glass sheet, bending mould and intermediate member together towards the heat sources. A mould lift means, i.e. an appropriate mechanism, is provided to accomplish this. The intermediate member may take a variety of forms, for instance a carrier frame or a platen or both. Alternatively, the intermediate member could be omitted altogether, and the mould lift means arranged to bear directly on the bending mould, so that again the mould is lifted without the carriage.

In the second embodiment, any walls on the carriage are reduced in height to below the level of the bending mould, and the dividing members which separate the heating zones are extended downwards to compensate, so that sealing of the zone is maintained. The carriage may then be lifted further than before, and preferably the carriages co-operate with the dividing members during raising of the carriage to seal the zone, e.g. the carriage is a sliding fit within the dividing members of the zone.

Both embodiments can accommodate variations in the size of bending moulds. This is advantageous, because a glass bending apparatus is required to produce a variety of different products, each one requiring a different mould, which may be of a different size.

At least part of the final shape of any product made in accordance with the invention is attained by gravity bending, also known as sag bending. Gravity bending techniques are capable of producing bent glass sheets of very high optical quality, and are thus particularly suitable for bending glass sheets to be laminated into vehicle windscreens, comprising at least one ply of plastics interlayer sandwiched between at least two plies of glass. When glass sheets are bent by gravity for use in laminating, it is preferred to bend two sheets together as a pair, one sheet disposed on top of the other, to ensure that the curvatures of the sheets will match when they form the inner and outer plies of a laminated windscreen. It is also preferred to anneal the sheets as a pair, still on the bending mould.

The bending of glass sheets to the shapes required for modern vehicles is frequently facilitated by heating one portion of the glass sheet to a greater temperature than another portion so as to create a temperature differential, a technique known as differential heating. The present invention is of great utility in differential heating because raising the glass sheet towards the furnace heat sources has the result that each furnace heat source heats a smaller portion of the sheet than before, which facilitates the creation of temperature differentials, especially between two portions of the sheet which are relatively closely spaced, and allows the attainment of greater temperature gradients between one portion and another.

Bringing the sheet closer to the heat sources also has the advantage that in certain situations, the heating power of the heat sources may be reduced, which in turn may alleviate optical distortion in the sheet caused by excessive heating.

There are certain glass shapes, required for modern vehicles, which possess curvature of relatively small radius ("sharp curvature") in certain portions of the sheet in which it is in fact difficult or impossible in practice to achieve the required curvature by gravity bending alone. An example is sharp curvature in the side portions of a sheet for a windscreen, i.e. the portions adjacent the A pillars after installation, so that the curve of the windscreen continues that of the surface of the A pillars and the windscreen locates accurately on the flanges of the vehicle body, or, in the language of the art, the windscreen has the correct "angle of entry". For such shapes it has been found expedient to subject the glass sheet to an auxiliary press-bending step, in addition to gravity bending, to obtain the desired shape. Press-bending is a technique well known to those skilled in the art, in which a glass sheet is pressed between opposed complementary shaping surfaces to impart the desired shape to the sheet. The present invention may be used in conjunction with press-bending, especially when press-bending is used to assist gravity bending.

Where this specification refers to a "bending mould" it is to be understood that this may be a standard gravity bending mould, or a gravity bending mould reinforced or otherwise adapted to be suitable for supporting the sheet while it is subjected to an auxiliary press-bending step.

BRIEF DESCRIPTION OF THE DRAWINGS

The invention will now be illustrated by the following non-limiting description of certain embodiments which makes reference to the accompanying drawings in which:

FIG. 2 is considerably enlarged with respect to FIG. 1.

FIG. 3 is also considerably enlarged with respect to FIG. 1, though not as greatly as FIG. 2. The line of section of FIG. 2 is shown on FIG. 3 as II—II.

FIG. 5 is a plan view of a lifting mechanism for lifting the glass sheets on four such adjacent carriages.

DETAILED DESCRIPTION OF THE INVENTION

Figure 1:
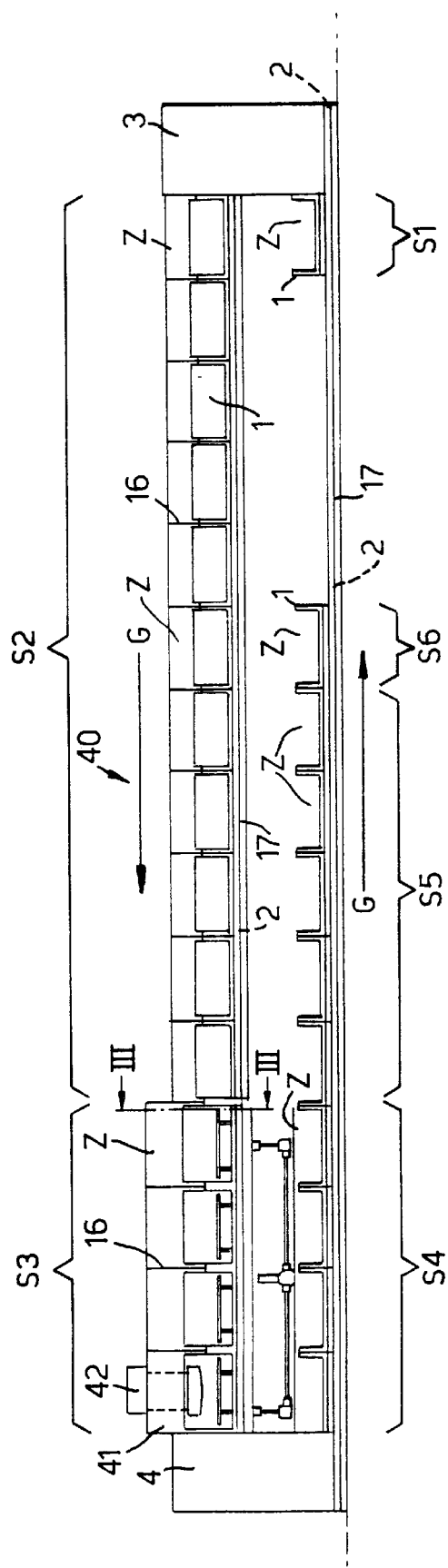
FIG. 1 is a schematic side view, partly in section, of an apparatus for bending glass in accordance with a first embodiment of the invention.

Referring to FIG. 1, a first embodiment of an apparatus for bending glass sheets is illustrated comprising an elongate indexing furnace 40 divided into zones Z on two tiers, division of the upper tier being by dividing members in the form of longitudinally spaced partitions 16. The zones ale grouped into sections S1 . . . S6 according to function. A carriage 1 having wheels running on rails 2 is normally disposed in each zone Z (it is possible to leave some zones Z vacant), and there is a drive means 17 (located alongside the rails 2) of conventional nature for moving the carriages along the rails. The drive means could be a so-called "walking beam" mechanism, in which reciprocating beams move alternate carriages. Alternatively, carriages may be winched, or driven by rack and pinion, or piston and cylinder, as they pass through a particular zone. A particular carriage may be driven, and propel others before it. A belt conveyor could be used, as in the second embodiment hereinafter described.

An indexing furnace is one in which the carriages move in intermittent steps, each carriage remaining stationary in each zone for a predetermined length of time before moving on to the next zone. The distance that each carriage moves during each step (i.e. the step length) substantially corresponds to one carriage length (or possibly more, e.g. two carriage lengths in a high throughput furnace in which the number of zones and carriages is doubled). In the embodiments herein described, the zones are of substantially the same length as the carriages, and so the step length corresponds to the distance separating corresponding points on successive zones.

A bending mould (not shown in FIG. 1) is normally disposed in each carriage 1, but according to production requirements, some carriages may be left empty. This method of transporting moulds is only one of several that could be used, but as indexing furnaces and mould transport systems are well known to the skilled person, those aspects will not be described in any more detail here.

The bending mould comprises a ring generally corresponding in outline to the periphery of the sheet, and may or may not include hinged sections. As mentioned earlier, it maybe adapted for use in an auxiliary press bending step.

In section S1 on the lower tier, flat glass sheets are loaded into the furnace in the form of blanks which have previously been cut for the particular product to be made. The sheets are preferably in superimposed pairs, each pair of sheets being placed on a bending mould. References in this specification to "a sheet" are to be understood as including "a pair of sheets", unless the context indicates otherwise. The box is conveyed into a box lift 3, in which the box is elevated to the upper tier, and enters a heating section S2. Heating of the glass sheets may be performed convectively or radiatively, or preferably a combination of both, and again heating arrangements are well known in the art. The temperature of the glass sheets increases as they are conveyed in stepwise indexing fashion in the direction of upper arrow G, supported on the gravity bending moulds, and the viscosity of the glass reduces until it has softened sufficiently for perceptible sagging to occur. The commencement of bending by sagging may occur earlier or later during the progress of a sheet along the upper tier according to the heating profile employed and those zones, through which the sheet passes before perceptible sagging occurs, will be referred to as pre-bending zones.

In this embodiment of the furnace, the final four zones of the upper tier are provided with a mould lift means, i.e. a raising/lowering means to raise the glass sheets, supported on the gravity bending moulds, towards furnace heat sources provided in the furnace roof and possibly at other positions above the level of the sheets, and similarly lower the sheets away from the furnace heat sources. These four zones constitute a heating and bending with mould lift section S3. However, according to the intended production rate and product shape range of the apparatus, more or fewer zones may be equipped with such mould lift means (hereinafter referred to as a "mould lift" for simplicity), and any of the heating zones could be so equipped. That is, a bending mould may be raised towards the furnace heat sources before or during bending of the glass sheet. In section S3, heating and bending of the glass sheets occur concurrently.

After leaving section S3 the glass sheets have normally reached the desired shape, but in the case of desired shapes which cannot be attained in practice by gravity bending alone, one of the further zones of section S3 (for example, the zone designated 41) may be adapted as a press bending zone in which the sheets are subjected to a press bending step by press bending means 42 in known fashion as described above.

Each carriage then passes into a further carriage lift 4 in which it is lowered to the lower tier. The pair of bent glass sheets is annealed in annealing section S4, cooled in cooling section S5, and unloaded in unloading section S6.

Figure 2A:
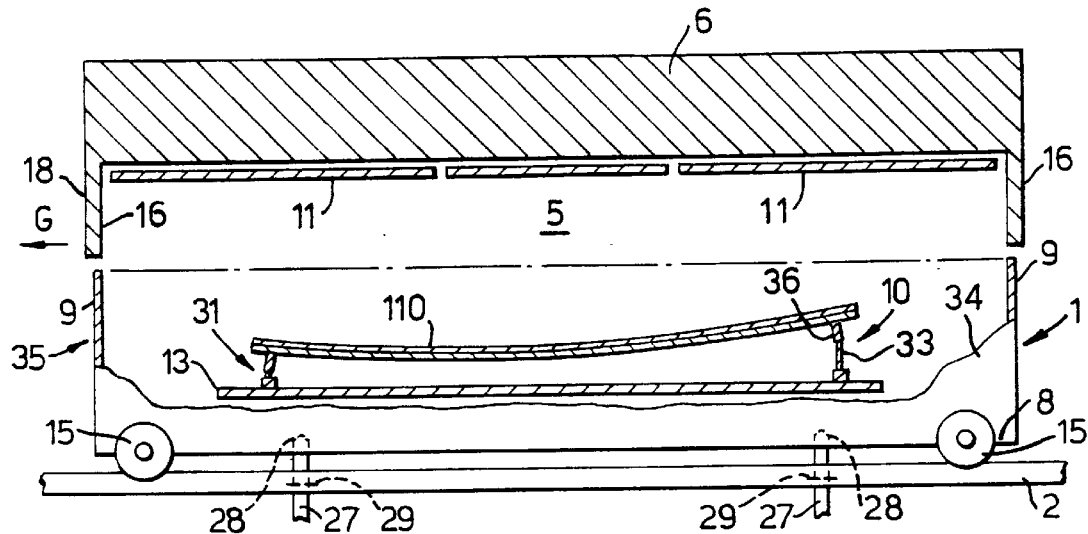
FIG. 2a is a longitudinal cross-section of one zone of FIG. 1, showing also a carriage partly in cross-section, and a bending mould.
Figure 2B:
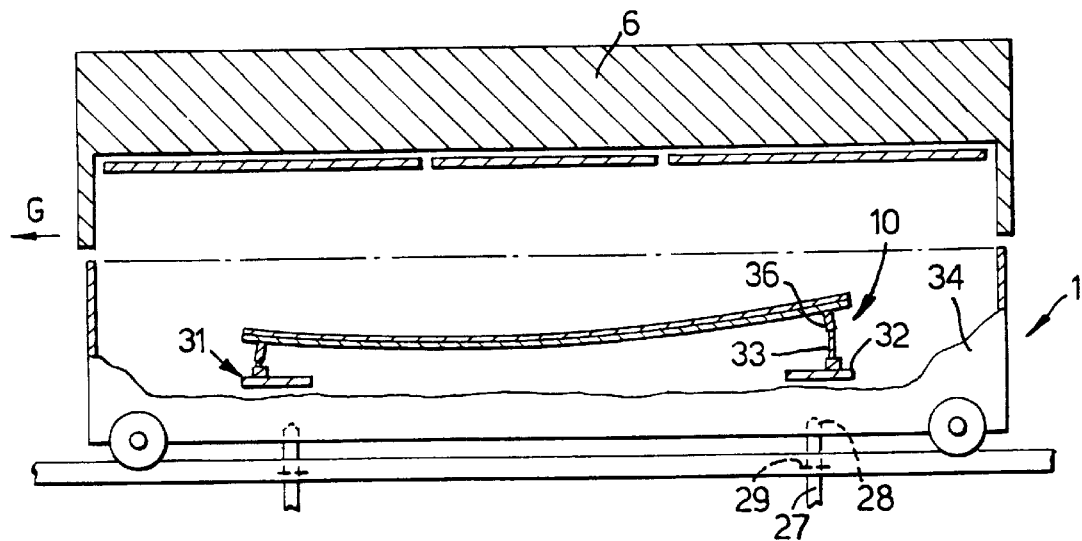
FIG. 2b is similar to FIG. 2a, but shows a different way of supporting the mould.
Figure 3:
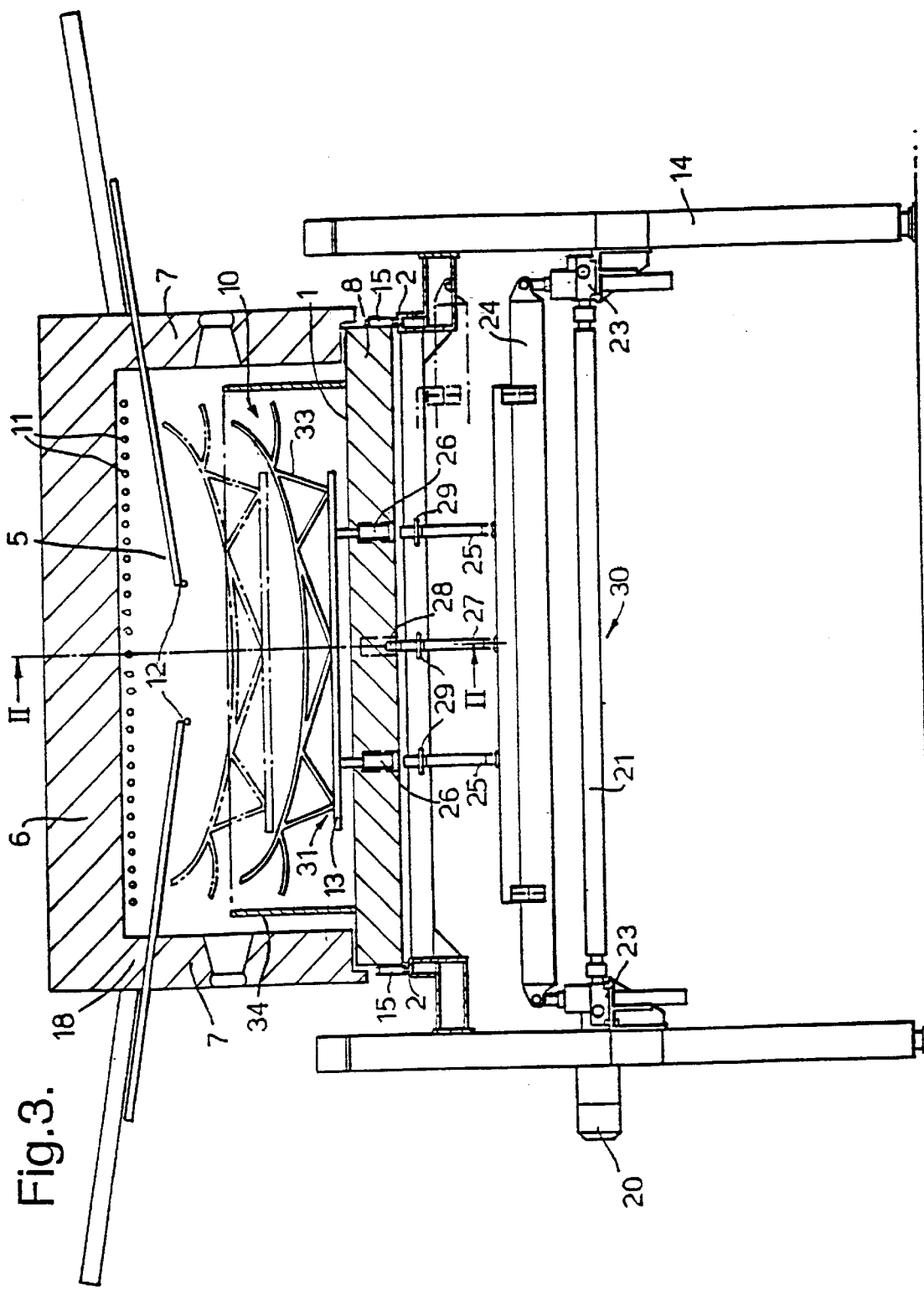
FIG. 3 is partly an end view, partly a transverse cross-section, of the apparatus of FIG. 1 viewed and taken along line III—III of FIG. 1, i.e. viewed in a direction at right angles to that of FIGS. 1 and 2.

FIGS. 2a and 2b show a longitudinal cross-section through a heating zone in section S3, while FIG. 3 illustrates a zone viewed in transverse cross-section in the direction of conveyance of the glass sheets. FIGS. 2a and 2b also show a carriage partially in section, while FIG. 3 further shows an end view of a mould lift means, generally designated 30. A space 5 in the furnace is defined by the furnace roof 6, transversely spaced furnace side walls 7 (FIG. 3), longitudinally spaced partitions 16 (FIG. 2) and the base 8 of the carriage 1. The carriage 1 has end walls 9 and side walls 34 which together with base 8 form a box 35. The base is preferably a compound member comprising one or more insulating layers between two or more skins. Each carriage 1 is provided with wheels 15 which run on rails 2. When the carriage is stationary, its end walls 9 co-operate with the partitions 16 extending downwards from the roof 6 to divide each zone Z from adjacent zones. The space 5, and more particularly the sheets of glass supported on bending mould 10, are heated by furnace heat sources comprising integral furnace heaters such as radiant roof elements 11 and optionally auxiliary heat sources, whose position is adjustable, such as crease heaters 12. Crease heaters 12 may be used to heat one portion of the glass sheets to a greater temperature than another portion, i.e. to differentially heat the sheet. Alternatively or in addition the integral furnace heaters 11 may be arranged (either in terms of their position, or their power output, or both) to differentially heat the glass sheets.

As mentioned before, the temperature differentials obtainable are increased in magnitude if the glass sheet (and hence the mould by which it is supported) is brought closer to the heat sources. Accordingly, in this embodiment of the invention, an intermediate member 31 is provided disposed between the mould 10 and the base 8 of the carriage 1. FIGS. 2a and 2b show two different forms of intermediate member. The intermediate member may take the form of a platen 13 parallel to and slightly above the base 8 of the carriage (FIG. 2a and FIG. 3). Alternatively, the platen may be recessed wholly or partly into the base, so that the top of the platen is flush with, or proud of, the surrounding part of the base. In this case, the part of the base underneath the platen would be thinner than the surrounding part. By raising the platen, at least part of the mould is raised above the highest part of the carriage, which in this embodiment is the top of the box 35.

The carriage itself is not raised, thereby reducing the load on the mould lift means, and avoiding disturbance to the thermal sealing arrangement between the box-shaped carriages and the upper part of the furnace. Use of a platen further assists in furnace sealing in that the platen can cover access holes for the mould lift mechanism, if they are in the base of the carriage. Retrofitting of a mould lift to existing indexing furnaces is facilitated if the carriages are not lifted and a raisable platen added to each carriage instead. In designs using a box-shaped carriage, operation of the mould lift raises the platen relative to the carriage and so, with sufficient travel, it is possible to lift the mould out of the carriage. This feature may be exploited in the loading and unloading sections by providing additional mould lifts there, for access to the glass sheets is thereby considerably improved.

FIGS. 2a and 3 show the platen 13, which is somewhat smaller in area than the base 8 of the carriage 1. The platen carries the bending mould 10, which includes various struts and spars 33 to support the mould rim 36 in conventional manner. Another advantage of using a platen is that it can readily accommodate a variety of different sizes of moulds,, as is needed to make all the parts (i.e. different sizes and shapes of bent glass sheet) required by the vehicle industry.

In an alternative version of this embodiment, shown in FIG. 2b, the intermediate member 31 is provided in the form of a carrier frame 32. This nay take any form that is of suitable strength and size to support the mould 10 and receive the thrust of the mould lift mechanism 30. It is characterised by being an open frame, so that it allows heat flow through, and is not so liable to distortion by temperature differentials as a platen.

In a still further version, the intermediate member could be integral with the bending mould, so that the intermediate member might, in effect, be constituted by a reinforcement of the lower part of the bending mould.

With any of the forms of intermediate member, it is preferable to arrange it so that the distance through which the intermediate member 31 can be lifted is greater than the separation between the top of the box 35 and the integral furnace heaters 11, (i.e. the fixedly installed heaters, not the crease heaters). With this arrangement, it is possible to raise the mould by a greater distance (and thereby bring it closer to the heat sources) than if the box itself were raised.

Figure 4:
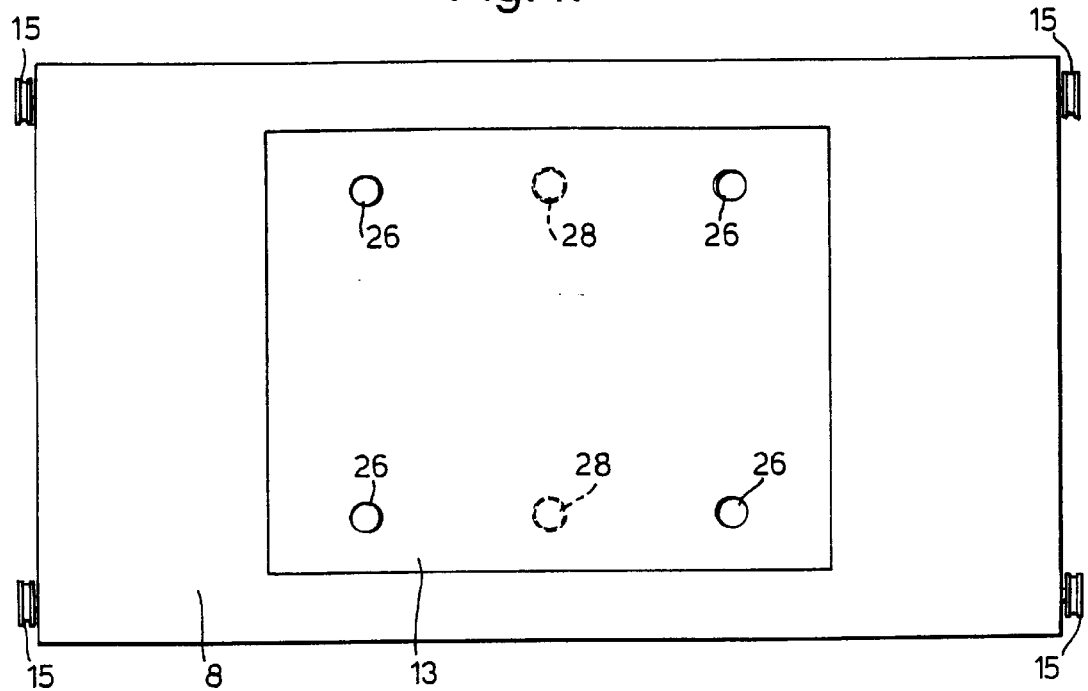
FIG. 4 is a plan view of a carriage in which a glass sheet is conveyed in FIGS. 1 to 3.

The mould lift mechanism will now be described with reference to FIGS. 2, 3, 4 and 5. FIG. 3 shows an end view of part of the mechanism, FIG. 4 shows the base 8 of carriage 1 together with the projected outline of the platen 13, and FIG. 5 shows a plan view of substantially the whole mechanism. Briefly, the mechanism includes a motor 20, driveshafts 21, gearboxes 22, screw jacks 23, frame 24, and lifting pins 25. In FIG. 3, mould 10 and platen 13 together with part of frame 24 are shown twice, once (in continuous lines) at the lowered level, and again (in phantom lines) at the raised level. Reversible motor 20 drives a series of driveshafts 21, connected to each other by the gearboxes 22. The driveshafts operate lead screws of the screw jacks 23 upon which the frame 24 is mounted. While in the present embodiment frame 24 lifts four platens 13 (or carrier frames 32) at once, it is clear that the mechanism can easily be adapted to lift them singly or in differently sized multiples.

The screw jacks 23 accordingly convert the rotary movement of the motor into a linear movement in the vertical direction, raising or lowering frame 24 according to the direction of rotation of the motor 20. A number of lifting pins 25, four in the present embodiment, extend upwards from the frame 24, pass through apertures in the form of bores 26 in the base 8 of the carriage 1, and bear on the intermediate member 31. That is, in the FIG. 2a version they engage the underside of the platen 13, whereas in the FIG. 2b version, they engage the carrier frame 32.

It is desirable to ensure accurate alignment of the carriage and intermediate member with the mould lift mechanism and the furnace heat sources. In the event that the carriage does not stop at precisely the correct location in a mould lift zone, a number of alignment pins 27, two in the present embodiment, are also provided extending upwards from frame 24. These pins 27 have conical tips to locate in corresponding closed bores 28 in the base 8, which are of accurate location and fit. Pins 27 are telescopic and do not perform a lifting function. Open bores 26 are accordingly of a looser fit around lifting pins 25, and are able to accommodate any slight lateral displacement of the carriage relative to lifting pins 25. Accurate location of the bending mould is important because the position of the mould (and hence the glass sheet) relative to the heat sources governs the location in the sheet of any temperature differential generated, and consequently affects the shape produced. Similarly, where an auxiliary press bending step is employed, the location of the glass sheet (in both vertical and horizontal directions) relative to the press bending means is critical for the shape produced. Since it is the intermediate member that carries the mould, accurate location of the intermediate member is in fact more important than of the carriage itself. To this end, the alignment pins 27 could extend right through the base 8 directly into the intermediate member 31, and the mould lift mechanism could be used to lift the mould to a predetermined reference level. Clearly this is only one of a number of possible lifting/aligning arrangements which the skilled mechanical engineer could employ. Alternative mould lift means could involve a scissor-type mechanism, or pneumatic jacks.

A further refinement is that both types of pin 25, 27 are provided with collars 29 in the form of large washers which are a sliding fit on the pins, and are of greater diameter than bores 26, 28. Compression springs (not shown) are provided encircling the pins between the collars 29 and the frame. When frame 24 is raised, the collars are held in tight abutment against the underside of the base 8 of the carriage 1, thereby covering the bores 26,28 and further improving the sealing of the furnace.

As can be seen in FIG. 3, the upper tier of the furnace and mould lift mechanism are both supported on steelwork 14. It has been found that the design of mould lift mechanism described above, which is suitable for location underneath the heating zones of the furnace, enables the raising or lowering of the glass sheet to be precisely controlled. This is because as much as possible of the mechanism is in a relatively cool environment, and cantilevered members for sideways transfer of lifting forces have been minimised.

In operation, a carriage 1 containing a pair of heat-softened glass sheets, supported on a bending mould 10, is conveyed into a zone Z in section S3 of the furnace. Carriage 1 stops with its longitudinally spaced fore and aft walls 9 in alignment with similarly longitudinally spaced partitions 16 extending downwards from roof 6 of the furnace. Motor 20 is activated, preferably by an automatic sequencing signal from the furnace control system, and intermediate member 31 (e.g. platen 13) is raised, carrying on it mould 10 and the pair of glass sheets, thereby raising them towards the furnace heat sources 11, 12. Normally, all four zones of section S3 are occupied by carriages, and four platens are raised simultaneously. It will be appreciated that the degree to which a mould is lifted above the uppermost part of the carriage, as well as the duration for which the mould (and glass sheets) are supported at a raised level, may be varied within the constraints imposed by the internal dimensions of the furnace zone and the time for which a carriage may remain stationary during the indexing cycle. When the predetermined duration has elapsed, motor 20 is activated in a reversed direction of rotation, and the intermediate member 31 (platen 13) together with mould 10 and glass sheets are lowered. The carriage 1 is then conveyed by the furnace drive means to the next zone, where, if it is a zone equipped with mould lift, the process is repeated.

It would be possible to toughen glass sheets in this embodiment of the invention if the glass sheets were placed singly on moulds, with suitable rims and the annealing section were replaced by a toughening section.

Figure 6:
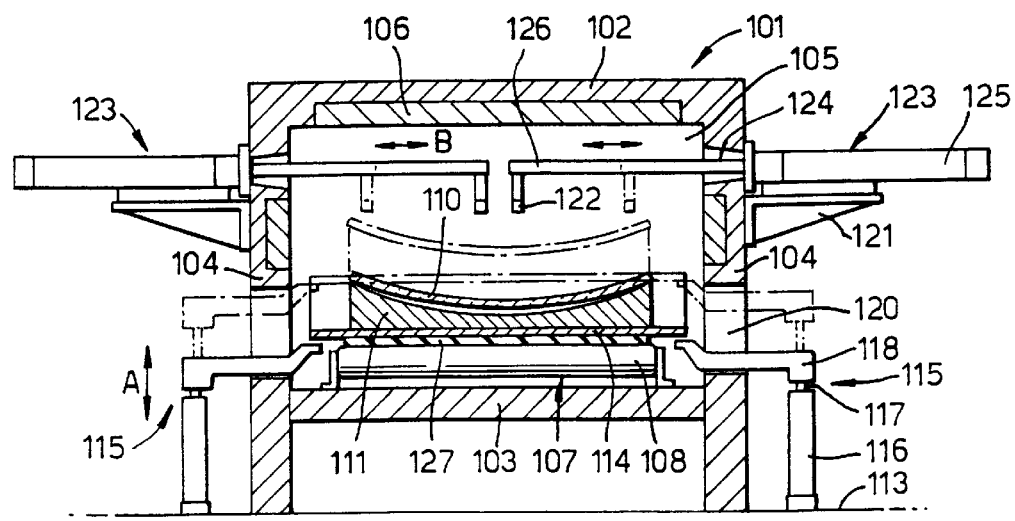
FIG. 6 is an end view, partly in section. of a second embodiment of the invention, viewed in the same direction as FIG. 3.
Figure 7:
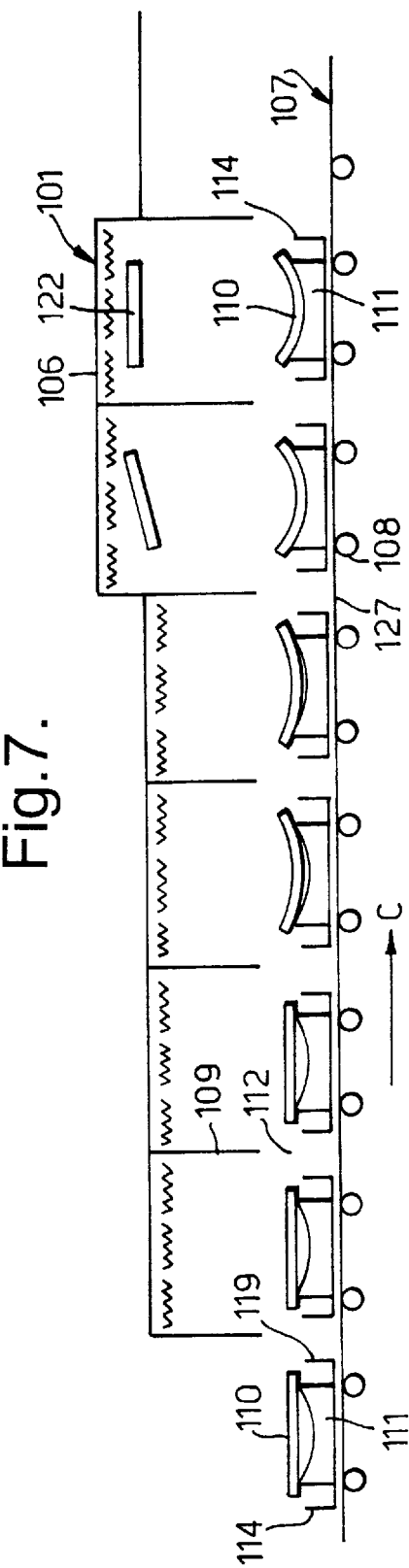
FIG. 7 is a schematic side view, partly in section, of the embodiment of FIG. 6, viewed in the same direction as FIG. 1.
Figure 8:
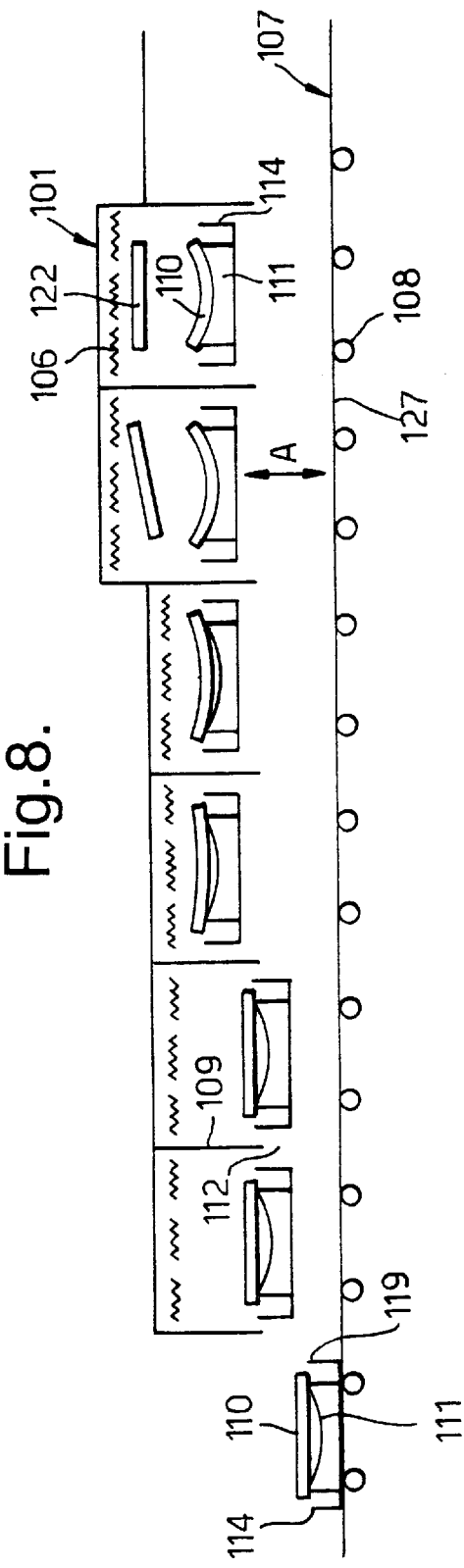
FIG. 8 is a further side view, partly in section, of the embodiment of FIGS. 6 and 7, showing glass sheets raised towards the furnace heating sources in accordance with the invention, and viewed in the same direction as FIGS. 1 and 7.

FIGS. 6 to 8 show a second embodiment of the invention, in which the whole carriage is raised; the carriages being designed so that part of the bending mould is above the highest part of the carriage. FIG. 6 is comparable with FIG. 3, and FIG. 7 with FIG. 1. In FIGS. 7 and 8, only the part of the furnace equipped with mould lifting mechanisms is shown, it being understood that the furnace also comprises loading, annealing (or possibly toughening), cooling and unloading sections as in the first embodiment. Again, as before, more or fewer of the heating, or heating and bending zones may be equipped with mould lift mechanism than is shown in the drawings.

As shown in FIG. 6, each of successive heating and bending furnace zones 101 has a space 105 which is defined therein to have the form of a rectangular parallelepiped and surrounded by a furnace roof 102, a furnace floor 103, as well as a pair of transversely spaced side walls 104, and a pair of longitudinally spaced partitions 109 (FIG. 7). A main furnace heater 106 is disposed in the underside of the roof 102, and rollers 108 supporting a belt 127 of a belt conveyor 107 are mounted on the furnace floor 103.

In this embodiment, the carriages 114 are not provided with wheels; instead, they are transported by the belt conveyor 107, which constitutes the drive 17 of this embodiment. The carriages 114 have walls 119 which co-operate with partitions 109 (which extend further downwards than the corresponding partitions 16 of the first embodiment) to thermally seal one zone from the next.

As shown in FIGS. 7 and 8, the longitudinally spaced partitions 109 have openings 112 defined below them so that a bending mould 111 conveyed by the belt conveyor 107 with a glass sheet 110 placed on the mould is kept from interfering with the partitions 109 when conveyed. The mould 111 may carry a pair of glass sheets 110.

On a floor surface 113 outwardly of the transversely spaced side walls 104, there is provided a pair of transversely spaced jacks 115 for vertically moving a carriage 114 with the mould 111 placed thereon. Each of the jacks 115 comprises a cylinder 116, a piston rod 117, and an arm 118 attached to a distal end of the rod 117, the arm 118 being movable in the direction of arrow A to any desired height. Then, the transversely spaced walls 104 have openings 120 defined therein for permitting the arms 118 to support and vertically move the carriage 114 in each of the furnace zones 101.

Further, positioners 123 for positioning a pair of transversely spaced crease heaters 122 are mounted, via respective attachment brackets 121, onto outer surfaces of the transversely spaced walls 104 above the openings 120. Each of the positioners 123 is arranged such that a piston rod 126 of a cylinder 125 extends through opening 124 defined in the appropriate tranversely spaced wall 104, and the crease heater 122 is attached to a distal end of the rod 126 to be able to take any desired position in the direction of arrow B.

Operation of the second embodiment of an apparatus for heating and bending glass sheets in continuous production comprising a furnace having zones 101 will now be described with reference to FIGS. 6, 7 and 8. FIG. 7 shows the carriages positioned on the belt conveyor for indexing, while FIG. 8 shows the carriages stationary and at two different raised levels above the conveyor.

When a glass sheet 110 disposed on mould 111 is conveyed from a zone in the furnace, the jacks 115 are lowered to transfer each carriage 114 from the arms 118 onto the belt 127 of the belt conveyor 107, and the belt conveyor 107 is then driven in the direction of arrow C as shown in FIG. 7, thereby conveying carriage 114 into the next zone. The length of arrow C denotes the distance separating corresponding, points on successive carriages.

After the carriage has been positioned in that zone, the jacks 115 are operated to elevate the arms 118, as shown in FIGS. 6 and 8, so that the glass sheet 110 is positioned in a preferred positional relationship with respect to the furnace heating sources comprising main furnace heaters 106 and crease heaters 122. In FIG. 6, glass sheet 110 is shown on mould 111 at the raised level in phantom.

Then, crease heaters 122 are positioned by respective positioners 123 at preferred locations in conformity with the form of the glass sheet 110, as shown in FIG. 6.

After the glass sheet 110 has been heated for a predetermined period of time, the jacks 115 are operated to lower the arms 118 to transfer the carriage 114 onto the belt conveyor 107 again, and the belt conveyor 107 is then driven to move carriage 114 along by the indexing distance, as shown by the length of arrow C in FIG. 7, thereby positioning it in the next zone in the furnace.

The glass sheet 110 is progressively heated in the succession of heating and bending furnace zones 101 arranged in series side by side, as explained above, and it is gradually bent into conformity with the shape of the bending mould 111 by the end zone of the furnace.

As in the first embodiment of the invention, a pair of glass sheets is preferably heated and bent together, one on top of the other, when the bent glass sheets are to be used in the manufacture of a laminated glazing.

While both embodiments described relate to indexing furnaces, the invention is also applicable with some modifications to tunnel or lehr furnaces of the type where glass sheets are continuously conveyed through the furnace. In this case, it would be necessary for the mould lift means to be adapted to accommodate the fact that the glass sheets, and the bending mould, are not stationary at the time they are raised or lowered.

What is claimed is:

1. An apparatus for bending a glass sheet possessing a periphery, the apparatus comprising:

an elongate furnace divided along its length into a plurality of heating zones, each heating zone having an upper part;

a plurality of furnace heat sources contained in the upper part of each of said heating zones;

a plurality of carriages arranged in succession along the length of the furnace below the furnace heat sources;

drive means for propelling the carriages through the zones of the furnace in intermittent steps, each step comprising moving the carriages from one heating zone to an adjacent heating zone by a distance separating corresponding points of successive heating zones;

at least one bending mould corresponding in outline to the periphery of the glass sheet, the mould being supported on one of the carriages; and mould lift means for raising the at least one bending mould towards the furnace heat sources.

2. An apparatus as set forth in claim 1, wherein the mould lift means is arranged to raise the bending mould so that at least part of the mould extends above the highest part of the carriage when the mould is in the raised position.

3. An apparatus as set forth in claim 1, wherein the mould lift means is arranged to bear directly on the bending mould, so that the mould lift means is operable to raise the mould without raising the carriage.

4. An apparatus as set forth in claim 1, wherein the bending mould is supported by an intermediate member disposed between the mould and the carriage, and the mould lift means is operable to raise the intermediate member and the bending mould towards the heat sources in at least one of the heating zones.

5. An apparatus as set forth in claim 4, wherein the mould lift means includes pins which bear on the intermediate member and pass through apertures in the carriage, so that the mould lift means is operable to raise the intermediate member and the bending mould towards the heat sources without raising the carriage.

6. An apparatus as set forth in claim 4, wherein the intermediate member includes a carrier frame.

7. An apparatus as set forth in claim 4, wherein the intermediate member includes a plate.

8. An apparatus as set forth in claim 4, wherein the carriage is in the form of a box, and the distance through which the intermediate member and the bending mould can be raised is greater than the separation between the top of the box and the integral furnace heaters.

9. An apparatus as set forth in claim 1, wherein one zone is occupied by only one carriage at any time, and the plan area of the carriage is substantially equal to the plan area of the zone.

10. An apparatus as set forth in claim 1, wherein the zones are separated by dividing members, and the carriages co-operate with the dividing members to substantially seal one zone from the adjacent zone.

11. An apparatus as set forth in claim 1, further comprising press bending means for subjecting the sheet to an auxiliary press bending step.

12. An apparatus as set forth in claim 1, wherein the mould lift means is disposed underneath the heating zones.

13. An apparatus as set forth in claim 1, wherein the mould lift means is disposed laterally of the heating zones.

14. An apparatus as set forth in claim 1, wherein the heat source is an auxiliary heat source.

15. An apparatus for bending a glass sheet possessing a periphery, the apparatus comprising:

an elongate furnace divided along its length into a plurality of heating zones that include first heating zones and a plurality of second heating zones, each heating zone having an upper part;

a plurality of furnace heat sources contained in the upper part of each of said heating zones;

a plurality of carriages arranged in succession along the length of the furnace below the furnace heat sources;

drive means for propelling the carriages through the heating zones of the furnace in intermittent steps, each step comprising moving the carriages from one heating zone to an adjacent heating zone by a distance separating corresponding points of successive heating zones;

at least one bending mould corresponding in outline to the periphery of the glass sheet, the mould being supported on one of the carriages; and mould lift means for raising the at least one bending mould towards the furnace heat sources that are located in the plurality of second heating zones.

16. An apparatus as set forth in claim 15, wherein the mould lift means is arranged to raise the bending mould so that at least part of the mould extends above the highest part of the carriage when the mould is in the raised position.

17. An apparatus as set forth in claim 15, wherein the mould lift means is arranged to bear directly on the bending mould so that the mould lift means is operable to raise the mould without raising the carriage.

18. An apparatus as set forth in claim 15, wherein the bending mould is supported by an intermediate member disposed between the mould and the carriage, and the mould lift means is operable to raise the intermediate member and the bending mould towards the heat sources in at least one of the heating zones.

19. An apparatus as set forth in claim 15, wherein the zones are separated by dividing members, and the carriages co-operate with the dividing members to substantially seal one zone from the adjacent zone.

20. An apparatus as set forth in claim 15, further comprising press bending means for subjecting the sheet to an auxiliary press bending step.

21. An apparatus as set forth in claim 15, wherein the mould lift means is disposed underneath the heating zones.

22. An apparatus as set forth in claim 15, wherein the mould lift means is disposed laterally of the heating zones.

23. An apparatus for bending a glass sheet which possesses a periphery, the apparatus comprising:

an elongate furnace divided along its length into a plurality of heating zones that each have an upper part;

a plurality of furnace heat sources contained in the upper part of each of said heating zones;

a plurality of carriages arranged in succession along the length of the furnace below the furnace heat sources;

at least one bending mould supported on one of the carriages, said at least one bending mould corresponding in outline to the periphery of the glass sheet for supporting the glass sheet along the periphery of the glass sheet;

a drive arrangement for moving the carriages through the heating zones of the furnace with a glass sheet supported on said at least one bending mould; and a mould lift device operatively associated with said at least one bending mould for raising said at least one bending mould towards the furnace heat sources while said at least one bending mould supports a glass sheet along the periphery of the glass sheet.

* * * * *